United States Patent
Paatero (10) Patent No.: US 7,366,905 B2
(45) Date of Patent: Apr. 29, 2008

(54) METHOD AND SYSTEM FOR USER GENERATED KEYS AND CERTIFICATES

(75) Inventor: Lauri Paatero, Helsinki (FI)

(73) Assignee: Nokia Corporation, Espoo (FI)

( * ) Notice: Subject to any disclaimer, the term of this patent is extended or adjusted under 35 U.S.C. 154(b) by 528 days.

(21) Appl. No.: 10/090,422

(22) Filed: Feb. 28, 2002

(65) Prior Publication Data

US 2003/0163700 A1   Aug. 28, 2003

(51) Int. Cl.
 *H04L 9/00* (2006.01)
(52) U.S. Cl. ............... 713/175; 713/176; 713/156; 380/277; 380/280
(58) Field of Classification Search ............ 380/280, 380/277, 380; 713/175, 176, 156
See application file for complete search history.

(56) References Cited

U.S. PATENT DOCUMENTS

| 6,209,091 | B1 * | 3/2001 | Sudia et al. ............... 713/175 |
| 6,418,421 | B1 * | 7/2002 | Hurtado et al. ............ 705/54 |
| 6,681,327 | B1 * | 1/2004 | Jardin ...................... 713/153 |
| 6,892,302 | B2 * | 5/2005 | Wheeler et al. ........... 713/172 |
| 7,016,666 | B2 * | 3/2006 | Lauper et al. ............. 455/411 |
| 2002/0118674 | A1 * | 8/2002 | Faccin et al. ............. 370/352 |
| 2002/0194219 | A1 * | 12/2002 | Bradley et al. ........... 707/506 |
| 2003/0014629 | A1 * | 1/2003 | Zuccherato ............... 713/156 |
| 2003/0084306 | A1 * | 5/2003 | Abburi et al. ............. 713/188 |
| 2003/0115342 | A1 * | 6/2003 | Lortz ....................... 709/229 |
| 2007/0050301 | A1 * | 3/2007 | Johnson .................... 705/59 |

FOREIGN PATENT DOCUMENTS

JP   9261218   * 10/1997

OTHER PUBLICATIONS

"Introduction to Public Key Cryptography" last updated Oct. 9, 1998. From the Internet at http://developer.netscape.com/docs/manual/security/pkin/contents.htm.
"Introduction to SSL", last updated Oct. 9, 1998. From the Internet at http://developer.netscape.com/docs/manual/security/sslin/contents.htm.
A Survey of Trust in Internet Applications by Grandison et al, IEEE Communications Surveys, Fourth Quarter 2000.
"Reasonings About Public-Key Certification: On Bindings Between Entities and Public Keys" by Kohlas et al, Department of Computer Science, Financial Cryptography 99.

* cited by examiner

*Primary Examiner*—Nasser Moazzami
*Assistant Examiner*—Eleni A Shiferaw

(57) ABSTRACT

A method and system to allow user generation of a private-public key pair and an associated user generated certificate to establish the identity of a user based upon signing the user generated certificate with a private key of a private-public key pair associated with a certificate issued by a Certification Authority (CA). The user generated certificate thereby allows the user that generated the certificate to establish a secure session with a third party without multiple use of the certificate issued by the CA, typically for use on another network infrastructure. The method and system are particularly useful for establishing a secure session, such as a Secure Socket Layer session using a personal computer, where the CA certificate is associated with a wireless identity module of a wireless device.

57 Claims, 6 Drawing Sheets

METHOD AND SYSTEM FOR USER GENERATED KEYS AND CERTIFICATES

TECHNICAL FIELD

The present invention is directed to the field of public key infrastructure and in particular, the generation of keys and certificates and the use of certificates issued by a Certification Authority for purposes of authenticating a user.

BACKGROUND OF THE INVENTION

Security issues are well-known with regard to the use of any network of computing or telecommunication devices. For such networks, including the Internet, authentication of a user is important, especially for establishing a secure connection between a user and a third party, the latter typically being a server. As is known in the art and as described in a publication entitled "Introduction to Public-Key Cryptograph" (last updated Oct. 9, 1998) available on the Internet at http://developer.netscape.com/docs/manual/security/pkin/contents.htm, public key cryptography can be used to establish a secure communication between a user and a third party, using various protocols, such as the Transport Layer Security (TLS) protocol, IP Security Protocol (IPSEC) or the Security Sockets Layer (SSL) protocol. As explained in a publication entitled "Introduction to SSL" (last updated Oct. 9, 1998) and available on the Internet at http://developer.netscape.com/docs/manual/security/sslin/contents.htm, a Secure Socket Layer comprises a handshake procedure that uses public-key encryption to establish the generation of a private symmetric key for two parties. This private symmetric key is then used for the remainder of the SSL session. In this protocol, as well as in other situations, e.g. email and the like, it may be required depending upon the needs of the third party, for the user to authenticate itself. Such authentication can be performed by use of a certificate which is an electronic document used to identify an individual, server, company or other entity so as to associate that identity with a public key. A Certification Authority issues a private-public key pair to a user based upon the published policies of the CA and upon generation of the private-public key pair, the public key is available for anyone's use and the private key is known only to the user for purposes of decryption and sometimes, encryption as explained more fully below.

For purposes of establishing a Secure Socket Layer which uses a symmetric key for both encryption and decryption, it is necessary that the private key be known only to the user and third party wanting to communicate to each other securely and not to anyone else. In order to establish the secret symmetric key for use in an SSL session, it is necessary that the two parties communicate to each other securely such as through use of a private-public key and it is generally further necessary for at least one, and sometimes both parties, to authenticate their identity to the other party. A method of authenticating a user is for that user to use its private key of a private-public key pair to encrypt a message which is then received by the other user and decrypted by the other user with the corresponding public key of the first user. Since the decryption is only possible if the public key is the same public key as in the private-public key pair issued by the Certification Authority for the first user, decryption of a message encrypted with the private key of the first user provides a means for authenticating the identity of that user by the other user (third party). The identity is ultimately established by the certificate issued by the CA and thus the third party trusts the identity of the first user based upon the certificate which identifies the first user.

Because the certificate issued by the Certification Authority binds a particular public key to the name of the user (entity) that the certificate identifies, it would normally be inappropriate for that user to be allowed to generate its own certificate for further identification of itself. Indeed, the public key infrastructure (PKI) which uses Certification Authorities to generate certificates, specifically prohibits a user having such a certificate from generating additional certificates for use to identify itself. The reason for this prohibition is to prevent a holder of a certificate from changing its identity through creation of additional certificates based upon an issued certificate from the Certification Authority.

A problem exists when a user in a first system has an authenticated identity via a certificate issued from a Certification Authority and wishes to use that authenticated identity to authenticate itself when using a network of another system. The typical situation is when a user of a computer connected to the Internet wants to establish its identity but does not have a certificate issued by a Certification Authority associated with the Internet, but rather has a certificate associated with a wireless device that the user possesses. It would be desirable for that certificate to be allowed as a means for identifying that user for use on the Internet (the second system) but to do so, would normally require issuance of a certificate by the user which is prohibited in PKI systems. In the past therefore, the Certification Authority which issued the certificate for use in the wireless system (first system) would have to provide an additional certificate for that user for use in identification over the Internet (the second system). The use of a user generated key and certificate as a means for authentification on the Internet (second system) by the user having an authenticated identity on another system such as the wireless infrastructure (first system) has therefore not heretofore been implemented.

SUMMARY OF THE INVENTION

The present invention is directed to a method and system for authenticating a user of a second system by means of an authenticated identity that the user has in a first system. The method and system are specifically directed to generating in the second system, a private-public key pair and certificate for use in the second system where the second system generated certificate is signed using the authenticated identity of the user in the first system.

The method and system is further directed to such a technique for authenticating a user in a second system where a third party communicating with the user of the second system is able to verify the user of the second system by the authenticated identity of the user of the first system. Such authentication can be performed by the certificate issued by a Certification Authority associated with the user of the first system.

In particular, the user of the second system is able to have the user generated certificate signed by the user of the first system by a digital signature using the private key of the user in the first system to encrypt information which is then presented to a third party with whom the user is communicating via the second system; which thereby provides the means for authenticating the identity of the user of the first system by decryption of the message using the public key of the private-public key pair associated with the private key of the first user. Such signing is sometimes referred to as a digital signature. The identity of the user of the first system is then authenticated by the certificate issued by the Certification Authority associated with the user of the first system. It should be noted that the user of the first system and the user of the second system is generally the same entity.

Furthermore, the present invention is directed to allowing a user of the Internet using a computer connected to the Internet to establish an authenticated identity for the purpose of establishing secure session, such as via a Secure Socket Layer (SSL), IPSEC or TLS, by use of the user's authenticated identity associated with a wireless device and its associated Wireless Identity Module (WIM) and in particular, a certificate issued by a Certification Authority for the user of the wireless device in which a private key for that user as established by the Certification Authority is maintained in the WIM on the wireless device.

Furthermore, the user generated certificate can have time and/or other limitations concerning its use so that once the session on the second system is completed, the certificate and its corresponding private-public key pair can be destroyed. This provides a degree of security for preventing generation of new identities by the generation of certificates by a user without the direct generation by a Certification Authority.

BRIEF DESCRIPTION OF THE DRAWINGS

For a fuller understanding of the nature and objects of the present invention, reference is being made to the following detailed description taken in conjunction with the following drawings in which.

BEST MODE FOR CARRYING OUT THE INVENTION

As is well-known in the art, communications over the Internet typically use Transmission Control Protocol/Internet Protocol (TCP/IP) for information exchange between two devices, where the information may pass through a variety of intermediate devices and networks which may be interposed between the two devices. The flexibility and robustness associated with TCP/IP has been a primary factor in its worldwide acceptance as the basic protocol for both the Internet as well as Intranet communications.

It is also known that security issues are present with regard to computers and other devices communicating via the Internet or other networks using the TCP/IP protocol, including such issues as eavesdropping, tampering, and impersonation (including spoofing and misrepresentation). Various techniques have evolved in order to address these issues including public-key cryptography which facilitates encryption and decryption, tamper detection, authentication of the origin of a communication, as well as non-repudiation concerning the sender of information (to prevent the sender from later claiming that it did not send the communication). An overview of these security issues is presented in a Netscape Communication document entitled, "Introduction to Public-Key Cryptography" which can be obtained on the Internet at http://developer.netscape.com/docs/manual/security/pkin/contents.htm (last updated as of the time of this application filing on Oct. 9, 1998). As explained in this publication, authentication is the ability to allow the recipient of information to determine the identity of the sender.

A certificate used to assist in authentication is an electronic document which identifies an individual or other entity through a private-public key pair issued by a Certification Authority (CA). A CA is typically an independent third party which will generate a private-public key pair and a corresponding certificate which binds the public key to the name of an identity the certificate identifies. Thus for instance, if a user wants a certificate and can meet the identification requirements of the CA (the published methods that the CA uses to validate an identity), then the CA can issue a certificate as well as the private key associated with the public-key bound to the certificate. The public key can be used by anyone to decrypt a message which has been encrypted using the corresponding private key (and vice versa). Thus if a user has a certificate, the user can distribute that certificate to any other party and can send a message to that party which has been encrypted using the user's private key. Thus the ability of the third party to decrypt that message with the user's public key effectively forms the basis for the third party to have assurance that the entity identified in this certificate is in fact the same as the entity which transmitted the encrypted information to the third party.

This method of authentication forms the basis for establishing a secure connection (session) between a user and a third party. Various secure session protocols can be used such as Transport Layer Security (TLS), IP Security Protocol (IPSEC) and Secure Socket Layer (SSL). Other protocols could of course be used. Secure Socket Layer is more fully described in Netscape Communication publication entitled, "Introduction to SSL" found on the Internet at http://developer.netscape.com/docs/manuals/security/sslin/contents.htm (last updated as of the time of this application filing on Oct. 9, 1998). SSL is a protocol which uses a symmetric private key known only to the user and the third party. Once the symmetric private key has been established between the user and the third party, the symmetric key provides the basis for both encryption and decryption of secured communications between the user and the third party. The certification process with the associated use of the private-public key of the certificate holder forms the basis for assuring either party of the identity of the other party (through use of the other party's certificate) as well as forms the basis for communicating information to establish the use of a particular secret symmetric key for use during a particular Secure Socket Layer session.

As is well-known in the art, only Certification Authorities can issue certificates which form the basis of authenticating a particular user with respect to a recipient of information from that user. If a holder of a certificate (that is a user having a certificate) was able to generate additional certificates, then it would be possible for the user to change its identity by certifying some other entity associated with a certificate which the user generates. This would undermine the overall concept associated with the use of certificates as a "letter of introduction" to authenticate entities using the Internet and other networks, and thus is generally prohibited under the procedures known as the public-key infrastructure (PKI).

Figure 1:
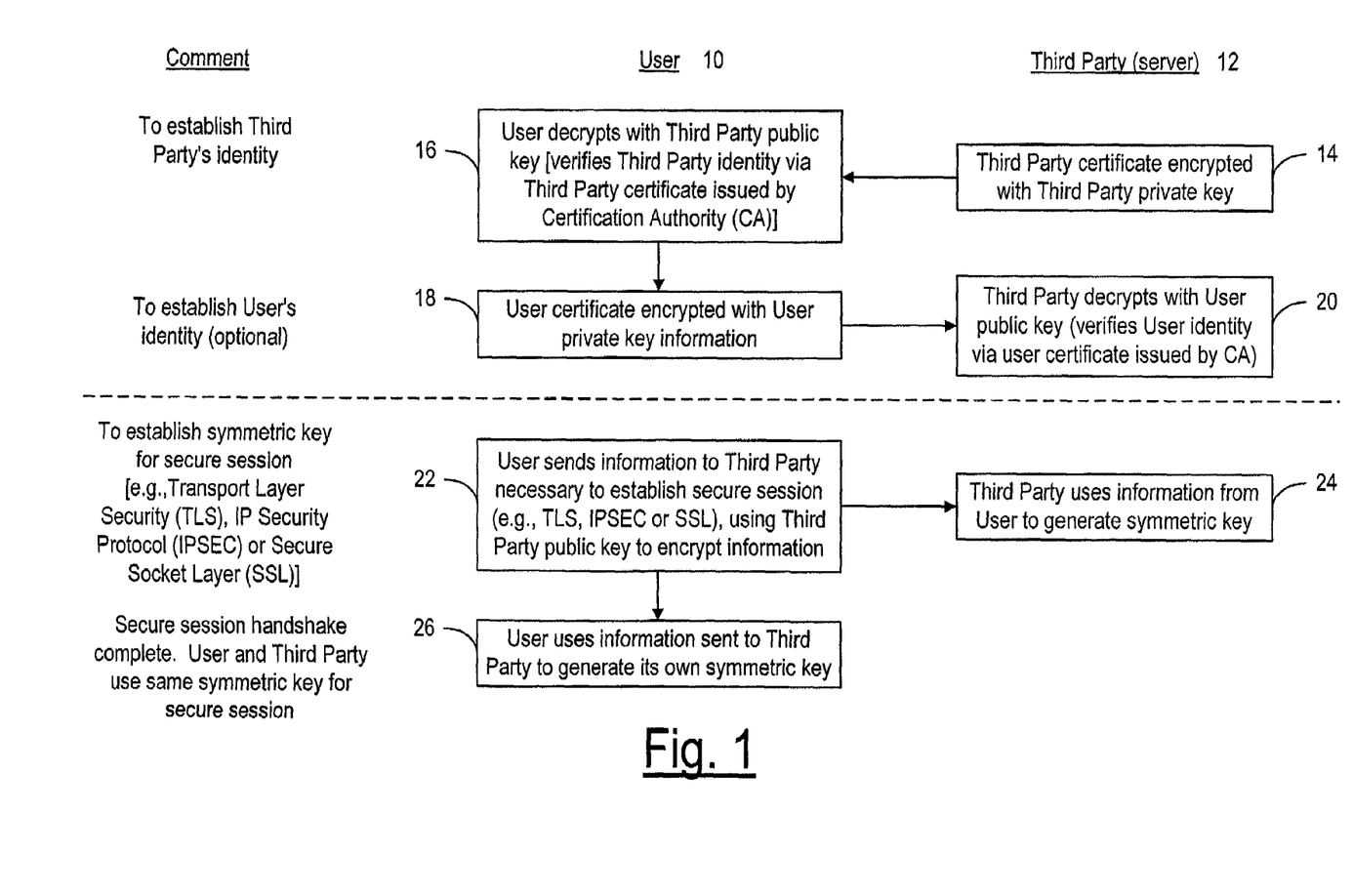
FIG. 1 is a protocol chart showing, in simplified form, the steps for establishing a secure session, and in particular a secure session via a Secure Socket Layer (SSL) handshake between a user and a third party.

FIG. 1 is an overview at a high conceptual level concerning the establishment of a secure session. It is particularly directed to establishing a secure session using Secure Socket Layer (SSL), although as noted earlier, other techniques for establishing a secure session could be used (e.g. TLS and IPSEC). As seen in FIG. 1, Secure Socket Layer handshake forms the basis for establishing a Secure Socket Layer session between a user 10 and a third party (TP) 12 who wish to communicate with each other securely, using a version of Secure Socket Layer. As seen in FIG. 1, the third party is typically a server and the third party typically communicates its identity to the user via a certificate which has been issued by a CA for that third party. The "signing" of the certificate is the process by which the third party encrypts the certificate and other relevant information needed to establish an SSL handshake using the third party's private key which is known only to the third party (and the CA) but is not known to users in general. Since user 10 knows (or is given) the public-key for the third party which is bound to the third party's private-key, the user can authenticate the third party's identity through the process of decrypting the signed certificate using the third party's public-key. These steps are shown by steps 14 and 16 of FIG. 1.

In addition, the third party may want authentication of the user which can be done through use of a user's certificate in an analogous manner as that described with regard to authenticate of the third party. This is shown in steps 18 and 20. Although other techniques can be used for authenticating a user (such as the use of a password which has been previously established between the third party and the user), certificates are a widely available resource for performing such authentication.

The remaining requirement for establishing an SSL handshake is the transmission of information necessary to establish the symmetric key which can be performed by the user transmitting encrypted information concerning generation of the particular symmetric key to be used using the public-key of the third party to perform the encryption process. This is shown is step 22. Since the information encrypted by the user using the third party's public-key can only be decrypted by the third party through use of the third party's private-key, a secure communication is established for transferring information necessary to generate the same symmetric key for both the user and the third party. This forms the basis for a Secure Socket Layer handshake and thus a Secure Socket Layer session between the user and the third party (steps 24 amd 26).

Figure 2A:
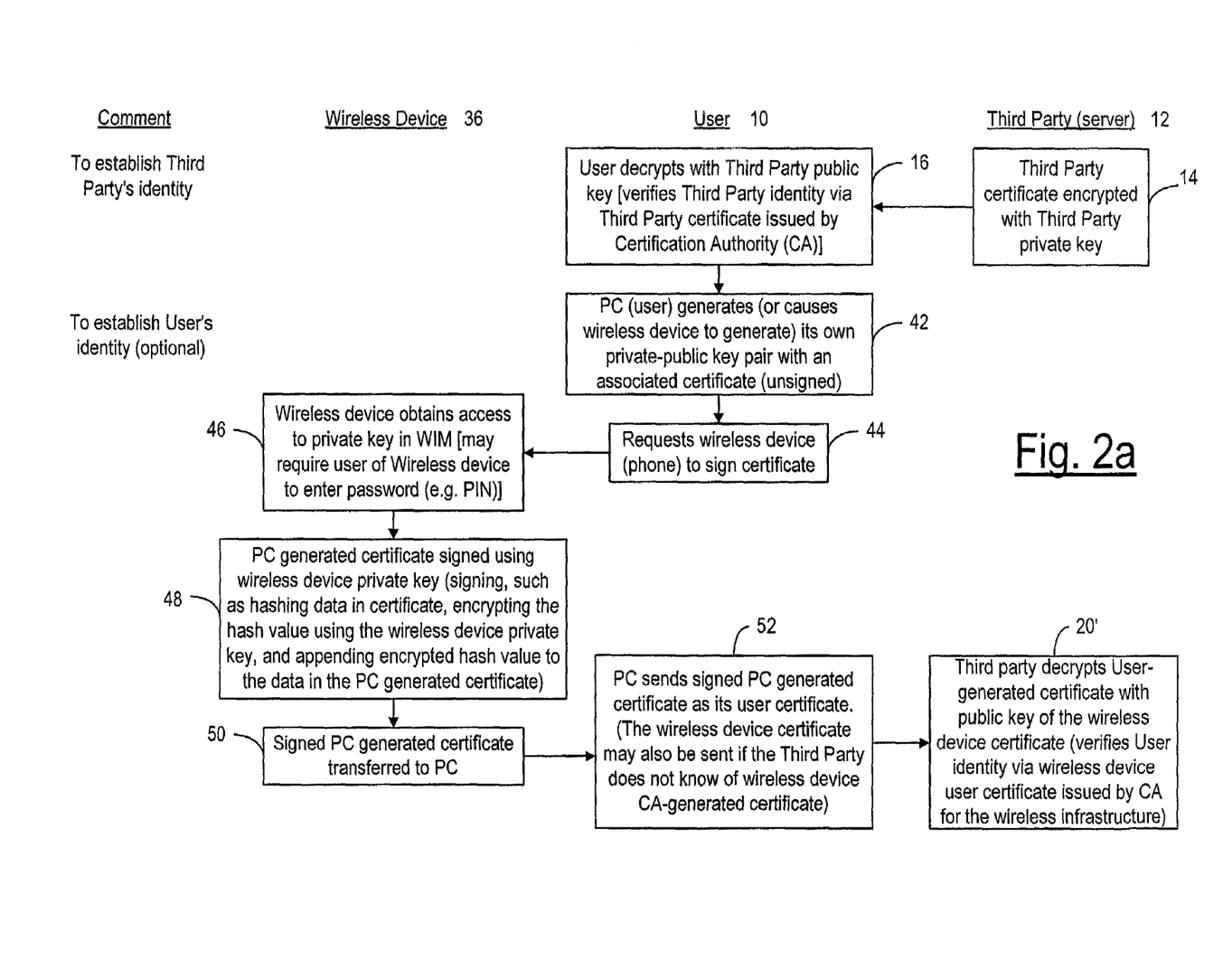
FIGS. 2a-2b form a protocol chart showing the establishment of a temporary private-public key pair for use in a second system for establishing a secure session, such as a Secure Socket Layer session, using the identity of the user in a first system to verify the identity of the user of the second system.
Figure 2B:
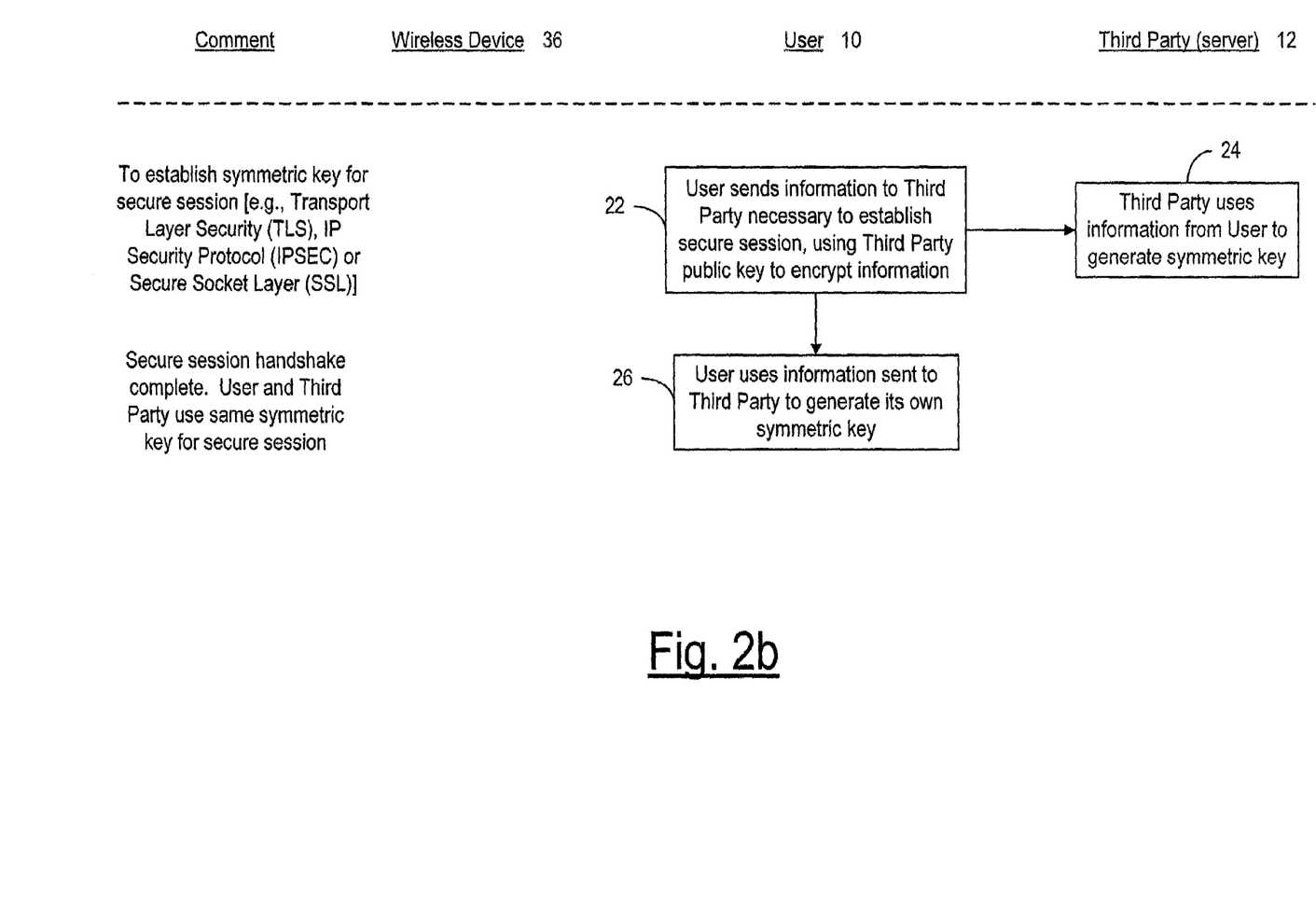
Figure 3:
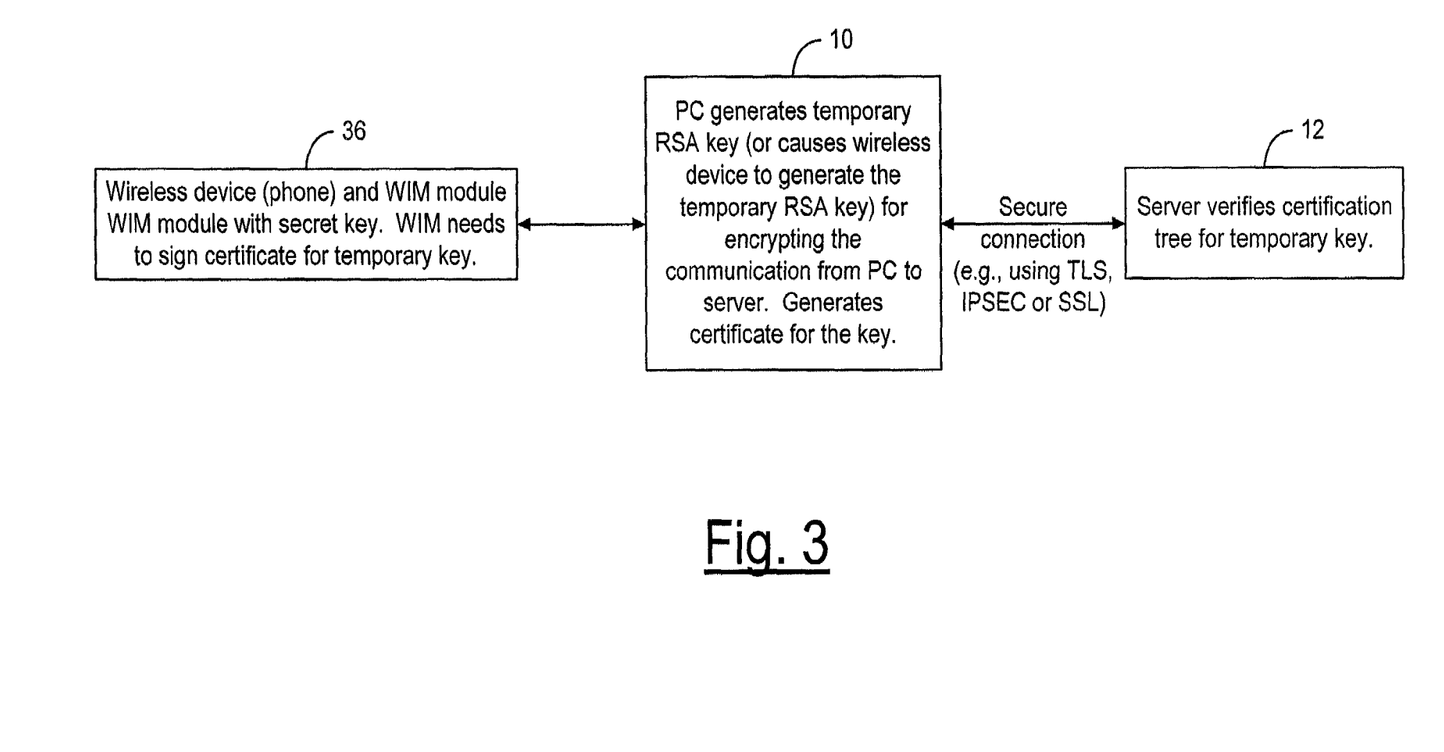
FIG. 3 is a flow chart showing a wireless device, a personal computer (PC) and a third party (e.g. a server) and the steps for establishing a secure session, such as a Secure Socket Layer session handshake between a personal computer and a server communicating via the Internet, wherein a personal computer PC uses a temporary private-public key pair for use in establishing its identity through a certificate generated by the PC, wherein the generated certificate is signed by a private key of a private-public key pair issued by a Certification Authority between a wireless device and that authority.

As seen in FIG. 2, it is sometimes advantageous if a user is able to authenticate itself to a third party using a procedure such as that set forth in FIG. 1 (whether or not for purposes of establishing an SSL handshake) but where the user does not have an authenticated identity via a certificate with regard to the network connection between the user and the third party. Thus in a typical example, the user and the third party may wish to communicate with each other over the Internet using the TCP/IP protocol, but the user does not have a certificate issued by a Certification Authority for the Internet and thus is not able to authenticate its identity using such a certificate. The user however, may have an authenticated identity with regard to a different communication system such as the wireless infrastructure. It would thus be desirable for the user to be able to use its authenticated identity with respect to the wireless communication system for at least temporarily identifying itself for use in the Internet communication system (second system). Of course one way to authenticate the user of the second system would be for the user to obtain a certificate for that second system from a CA. This may be unnecessary however if the user already has a private-public key pair issued by the Certification Authority for the first system. The problem has always been that the user cannot generate a temporary private-public key pair and associated certificate for use in the second system since the user has no way to authenticate itself in that second system.

As seen in FIG. 2, the present invention provides an elegant solution to the problem by allowing a user of a second system, such as a PC on the Internet, to authenticate itself and thus be able to establish a secure communication with the third party using the authenticated identity of the user as evidenced by a certificate issued by a Certification Authority of a first system, such as a wireless infrastructure system. In order to achieve this result, a user generated certificate is generated with regard to the second system which is acceptable for identification of the user based upon the user's CA provided certificate for the first system.

In practice this can be achieved by the user generated certificate being accepted by a third party if the certificate identifies the same entity as the entity identified by the certificate issued by the Certification Authority for the first system. Thus for instance, the user may have a private-public key issued by a Certification Authority for the wireless infrastructure which is stored in what is known as a Wireless Identity Module (WIM) 38 of the wireless device 36 (see FIG. 5). This private-key has an associated public-key and certificate containing the public-key issued by a Certification Authority for the wireless communication system. If the user generated certificate for the second system contains information concerning the identity of the user in the second system which corresponds to the identity of the user in the first system, the user of the second system can verify that identity through the certificate identified in the first system which forms part of the user generated certificate communicated between the user and the third party in the second system. To authenticate the user generated certificate, the user of the second system signs the user generated certificate using the private key of the first systems' private-public key pair. Such signing is typically performed by calculating a count hash value (e.g. using Secure Hashing Algorithm -1 (SHA-1)), the data forming at least part of the user generated certificate (see e.g. X.509 v3 relating to certificates). This hash value is then signed by encrypting the hash value using the private key of the wireless device. This encrypted hash value is then typically appended to the end of the data in the user generated certificate.

FIGS. 2a-2b, 3, 4 and 5 show the actual steps and hardware for achieving this result. Thus the wireless device (such as a mobile telephone) has an associated WIM module 38, wherein the WIM module contains the private-key of the private-public key pair issued by a Certification Authority associated with the wireless communication infrastructure. A personal computer (PC) 10 or other computing device represents a user that desires to establish a secure communication with a third party (TP) 12 such as a server that typically communicates over a different system. As seen in step 42, if this user needs to authenticate itself it generates its own private-public key pair with the user generated public key placed in a user generated certificate. Optionally, the private-public key pair could be generated by the wireless device (see step 42 of FIG. 2a, also see FIG. 3 and FIG. 4). Preferably, the private-public key pair would be generated by the PC (user). This user generated certificate is at this point in time unsigned and therefore is not a true certificate until it is signed. As seen in steps 44, 46, 48 and 50, this user generated certificate is signed using the private key of the wireless device 36. This signing can be performed by hashing data in the user generated certificate using e.g. the SHA-1 algorithm, then encrypting this hash value using the private key of the wireless device, and finally appending the encrypted hash value to the end of the data in the user generated certificate. Thus steps 44, 46 and 48 show the transfer of this certificate and its signing by the private key within WIM module 38.

This signed user generated certificate is transferred back to the PC (step 50) where it is then transferred to the (TP) third party for authenticating the identity of the user of the PC (step 52).

If desired, the authenticated identity of the user of the PC can then proceed to establish a secure session with the TP (steps 22, 26) of FIG. 2b.

It should be noted that the PC (user) generated private-public key pair normally comprises an RSA public-key algorithm and an associated RSA key exchange procedure used in the SSL handshaking portion for establishing an SSL session.

The CA-certified public WIM key is typically used to authenticate the user. This certified public-key has the form:
"WIM ID", "public WIM key", "CA-certificate".

Figure 5:
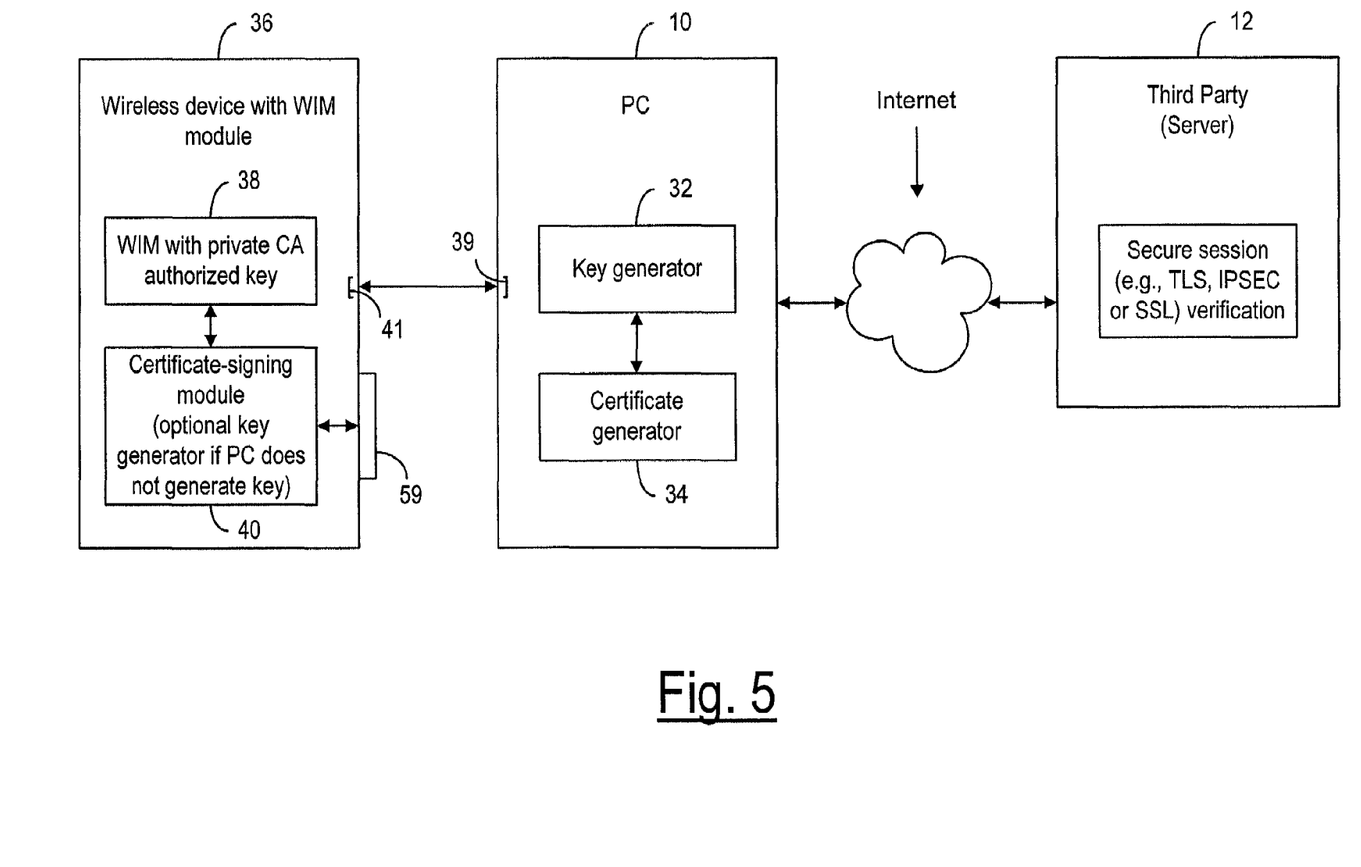
FIG. 5 is a block diagram of a wireless device, PC and third party communicating with each other according to the present invention.

In the present invention, the user is able to generate a new private-public key pair without contacting a CA, and signs the public key of this pair by using the private key in the wireless device WIM 38. This new public key has the form:
"myown ID", "myown public-key", "myown certificate"; where the "myown certificate" is the WIM signature. In this manner, the wireless device authenticates itself to the PC at the beginning of the session after which the PC uses the WIM-certified temporary private-public key pair to establish authenticated communications over the Internet. Therefore the PC on the Internet can act independently from the wireless device and the wireless device does not have to interact with the PC for continuation of communication between the PC and third party devices such as servers and the like.

It should further be noted that the PC (user) generated certificate can include the identity of the user as part of the certificate. Alternatively, the user generated certificate can omit any specific reference to a user's identity, but instead include the full certification tree of the wireless infrastructure CA generated certificate for purposes of identifying the user of the PC.

Once a secure session is established, the need for contacting the wireless device 36 for purposes of identity authentication are drastically reduced, since the TP (server) has effectively accepted the wireless infrastructure certified identity as the identity of the user of the second network system (e.g. the Internet).

Figure 4:
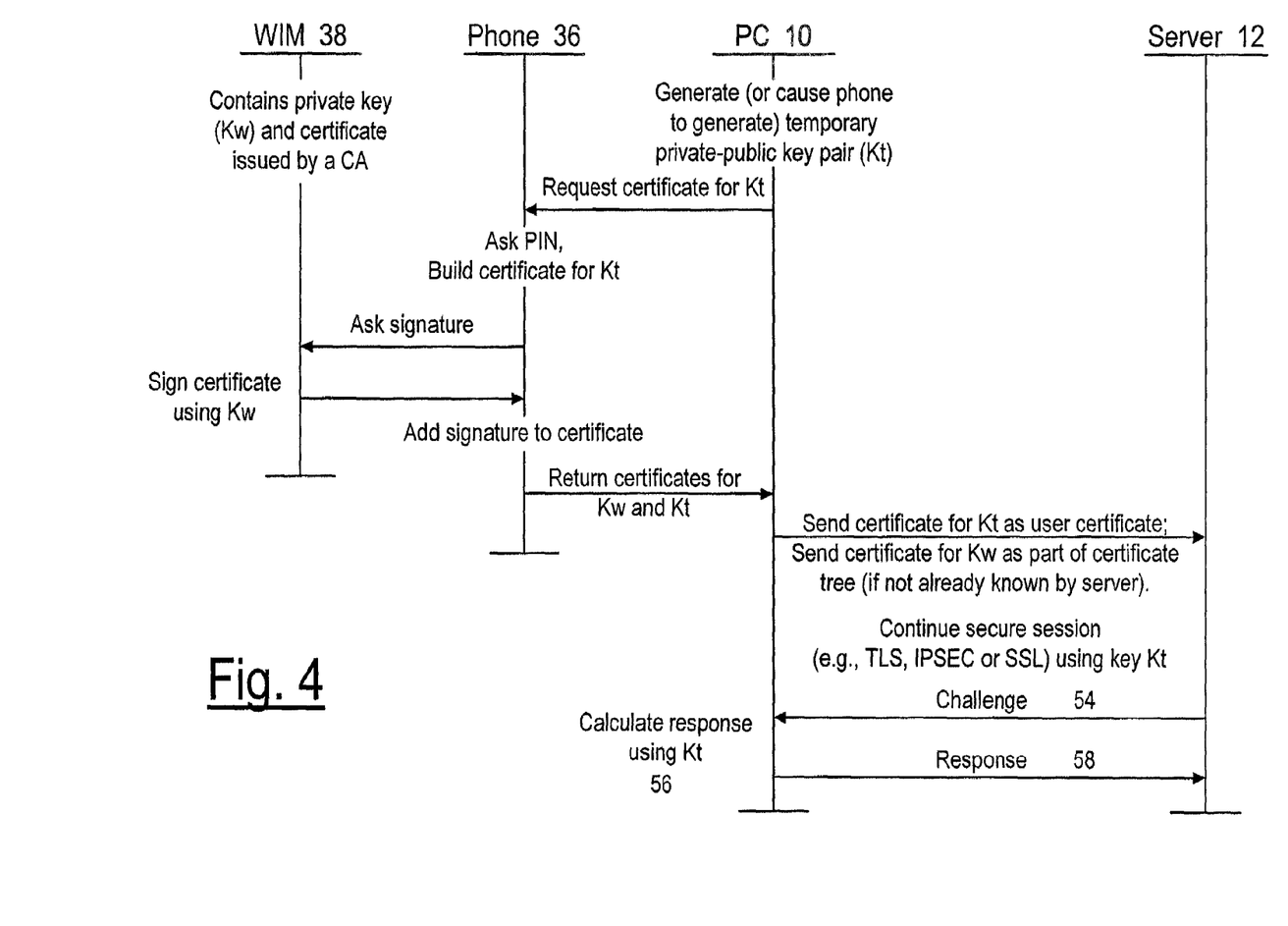
FIG. 4 is a diagram showing the a wireless device (phone), PC and a third party (server) and the communications presented therebetween for establishing a secure session, such as a Secure Socket Layer session.

As seen in FIG. 4, only when there is a challenge to this authenticated identity (event 54) is it necessary for the PC to calculate a response based upon the user generated private key (event 56), which response is transferred to the TP (event 58). Thus the wireless device does not need to be in communication with the PC except for initial signing of the user generated certificate.

In many situations, it is desirable to make the user generated certificate a temporary certificate so as to limit its temporal usage, and thus its ability to be used in general to establish the identity of the PC (user). This limits the probability that such user generated certificates can be used fraudulently. In many situations, the certificate and corresponding private-public key pair are destroyed after a Secure Socket Layer session. The user of the second system may also generate other usage limitations in the certificate, such that the private key bound to the certificate can only be used for encryption and cannot itself be used for signature verification (signature verification only with the signing of certificate by wireless infrastructure CA certified private key—steps 46, 48 of FIG. 2a). Thus the user generated public key could only be used for decryption purposes by third parties for purposes of communicating with the user of the second system, but not for signature verification; that is, for third party encrypting of information with the public key of the user generated certificate, but not allowing the associated private key to be used for signature verification by user 10.

In short, the private key contained within the wireless device WIM module is used for purposes of signing the user generated certificate of the second system for purposes of establishing the identity of the user of the second system. The private key of the user generated private-public key pair is not used for this purpose.

FIGS. 4 and 5 show the details of the protocol according to the present invention in an application in which there is a PC 10 and server 12 that communicate with each other, such as via the Internet, and where the PC and a wireless device (phone) 36 communicate with each other via whatever manner the two devices can communicate to each other, such as through a wireless interface or infrared ports 39 and 41 on the PC and wireless device respectively.

FIG. 5 shows the components of a third party such as a server 12, a personal computer 10 and a wireless device 36 with the associated modules for communicating between the PC and the third party device via the TCP/IP protocol such as the Internet, and between the PC 10 and the wireless device 36 using ports 39, 41 such as infrared ports or wireless ports. The PC 10 has a key generator 32 which can generate a private-public key pair such as an RSA key pair for encrypting communications between itself and the server. The PC also has a certificate generator 34 which is used for purposes of certifying the PC with regard to the server. The user generated certificate created by the certificate generator 34 is authenticated by signing the certificate with the private-key associated with the wireless device 36. The wireless device contains a wireless identity module 38 (WIM) which contains the private-key for the user, the private-key forming part of a private-public key pair as generated by a Certification Authority with an associated certificate for the private-public key pair. The wireless device further contains certificate signing module 40 which can access the private-key within the WIM for purposes of signing a certificate which can include the user generated certificate generated by PC 10. Thus the user generated certificate from PC 10 is signed with the private-key of the wireless device and the signed certificate is used for purposes of authenticating the user of the PC to the server. The certificate signing module 40 may require receipt of a password from the user of the wireless device via an input device 59. This password may be a personal identification number (PIN) which is used for purposes of obtaining access to the private key contained within the WIM 38.

Thus what has been described is a method and system for generating user generated certificates for use on a second system for purposes of authenticating the user of the second system. It can therefore form the basis of secure communication between the user and a third party on the second system by means of generating a private-public key pair and a user generated certificate associated with that key pair, with the user generated certificate being certified by signing of the certificate with a certified private-key associated with a first system having a CA certified certificate. The user generated certificate may incorporate usage and time limitations. The invention is also directed to component devices used in such a method and system.

Having described the invention, what is claimed is:

1. A method comprising:
having an identity authenticated in a first system;
a second system causing a key to be generated for use in the second system;
the second system generating a certificate for the key; and
establishing the identity of a user in the second system by signing the certificate for the key using the authenticated identity of the user in the first system,
wherein the certificate for the key for use in the second system contains usage limitations, including a temporal limit on usage,
wherein the temporal limit requires that once a secure socket layer session on the second system is completed, the certificate or a corresponding key is destroyed,
wherein said usage limitations also include a limit on use of said key for encryption only, which excludes use of said key for signature verification; and
wherein the first system is a wireless communication system and wherein the second system is a computer connected to an Internet.

2. A method as defined in claim 1, wherein the key is generated by the second system.

3. A method as defined in claim 1, wherein the key is generated by the first system.

4. A method as defined in claim 1, further comprising the step of: a third party communicating with the user of the second system and verifying the user of the second system by the authenticated identity of the user of the first system.

5. A method as defined in claim 4, wherein the third party is a server.

6. A method as defined in claim 4, wherein the key comprises a private-public key pair and where the certificate includes the public key of the key pair.

7. A method as defined in claim 6, wherein the certificate further includes an identity which is the same as the authenticated identity of the user of the first system.

8. A method as defined in claim 7, where the authenticated identity of the user in the first system comprises a private-public key pair and a certificate issued by a certification authority, and where the signing of the second system generated certificate is by hashing at least some data in the certificate to obtain a hash value, encrypting this hash value using the private key of the first system private-public key pair, and adding the encrypted hash value to the certificate.

9. A method as defined in claim 8, wherein the private key of first system private-public key pair is stored in a wireless identity module.

10. A method as defined in claim 9, wherein the private key of the first system is accessed by entry of a password.

11. A method as defined in claim 6, where the identity of the user in the first system comprises a private-public key pair and an associated certificate issued by a certification authority.

12. A method as defined in claim 11, wherein the private key of first system private-public key pair is stored in a wireless identity module.

13. A method as defined in claim 12, wherein the private key of the first system is accessed by entry of a password.

14. A method as defined in claim 1, wherein the authenticated identity of the user of the first system forming at least part of the signing of the certificate for the key for use in the second system includes encryption of data with the private key of the user of the first system, wherein the identity of the user of the first system is certified by a certification authority through a corresponding public key for the user of the first system.

15. A method as defined in claim 14, wherein prior to signing the certificate for the key for use in the second system, the user of the first system obtains access to its private key by entry of a password.

16. A method as defined in claim 15, wherein the password is a personal identification number.

17. A method as defined in claim 1, wherein the certificate for the key includes the full certification tree for the key, said full certification tree including a certificate of the first system for the user of the first system.

18. A method as defined in claim 17, wherein the second system uses a security protocol for establishing a secure session.

19. A method as defined in claim 18, wherein the security protocol is selected from the group consisting of transport layer security, internet protocol security protocol and secure socket layer.

20. A method as defined in claim 18, wherein the wireless communication system uses a wireless identity module in an associated wireless device of the user of the first system for establishing the identity of the user of the first system.

21. A method as defined in claim 20, wherein the wireless identity module contains a private key of the user of the first system and wherein a corresponding public key of the user of the first system is certified by a certification authority.

22. A method as defined in claim 1, wherein one usage limitation is that a third party of the second system should accept the key for use in the second system only for certain types of operations.

23. A method as defined in claim 22, wherein an accepted operation is the use of the key for use in the second system for encryption of data but not for signature verification.

24. A method as defined in claim 1, where the certificate does not contain the identity of the user associated with the user generated key, and where the signing of the certificate using the authenticated identity of the user of the first system includes appending the full certification tree of the first user to the user generated key.

25. A method as defined in claim 1, where the first and second users are the same entity.

26. A method comprising:
generating a key for use in a network environment by a user having an authenticated identity not associated with said network environment;
generating a certificate for the key; and establishing the identity of the user in said network environment by signing the certificate for the key using the user's authenticated identity, wherein the certificate for the key for use in the network environment contains usage limitations, including a temporal limit on usage, wherein the temporal limit requires that once a secure socket layer session on the second system is completed, the certificate or a corresponding key is destroyed, wherein said usage limitations also include a limit on use of said key for encryption only, which excludes use of said key for signature verification; and wherein the first system is a wireless communication system and wherein the second system is a computer connected to an Internet.

27. A system comprising:

a device forming part of a second system, the device having means for causing a key to be generated for use in the second system by a user having an authenticated identity in a first system, said device of the second system having means for generating a certificate for the key; and a second device forming part of the first system, the second device having means for storing information regarding the authenticated identity of the user in the first system, said second device further having means for communicating said information; and wherein the device of the second system has means for receipt of said information from the second device, and further has means for establishing the identity of the user in the second system by signing the certificate for the key using the authenticated identity of the user in the first system, wherein the certificate for the key for use in the second system contains usage limitations, including a temporal limit on usage, wherein the temporal limit requires that once a secure socket layer session on the second system is completed, the certificate or a corresponding key is destroyed, wherein said usage limitations also include a limit on use of said key for encryption only, which excludes use of said key for signature verification; and wherein the first system is a wireless communication system and wherein the second system is a computer connected to an Internet.

28. A system as defined in claim 27, wherein the device of the second system further comprises means for generating said key.

29. A system as defined in claim 27, wherein the second device forming part of the first system further comprises means for generating said key.

30. A system as defined in claim 27, wherein a third party communicates with the user of the second system, said third party communicating via a third device, said third device having means for verifying the user of the second system by the authenticated identity of the user of the first system.

31. A system as defined in claim 30, wherein the third device is a server.

32. A system as defined in claim 27, wherein the key comprises a private-public key pair and where the certificate includes the public key of the key pair.

33. A system as defined in claim 32, wherein the certificate further includes an identity which is the same as the authenticated identity of the user of the first system.

34. A system as defined in claim 33, where the authenticated identity of the user in the first system comprises a private-public key pair and a certificate issued by a certification authority, and where the means for signing the second system generated certificate is by encrypting this second system generated certificate using the private key of the first system private-public key pair.

35. A system as defined in claim 34, wherein the private key of the first system private-public key pair is stored in a wireless identity module forming part of the second device.

36. A system as defined in claim 35, wherein the second device includes means for user entry of information, wherein the private key of the first system is accessed by entry of a password via said user entry means.

37. A system as defined in claim 32, where the identity of the user in the first system comprises a private-public key pair and an associated certificate issued by a certification authority.

38. A system as defined in claim 37, wherein the private key of the first system private-public key pair is stored in a wireless identity module forming part of the second device.

39. A system as defined in claim 38, wherein the private key of the first system is accessed by entry of a password.

40. A system as defined in claim 27, where the user of the first system authenticated identity includes a private-public key pair, where the identity of the user of the first system is certified by a certification authority through a corresponding public key for the user of the first system, and wherein the means for signing the certificate includes signing the certificate for the key for use in the second system by encryption of data with the private key of the user of the first system.

41. A system as defined in claim 40, wherein the second device includes means for user entry of information, and wherein the user of the first system obtains access to its private key by entry of a password via said user entry means.

42. A system as defined in claim 41, wherein the password is a personal identification number.

43. A system as defined in claim 41, wherein the second system uses a security protocol for establishing a secure session.

44. A system as defined in claim 43, wherein the security protocol is selected from the group consisting of transport layer security, internet protocol security protocol and secure socket layer.

45. A system as defined in claim 43, wherein the second device forming part of the wireless communication system includes a wireless identity module for storing information used to establish the identity of the user of the first system.

46. A system as defined in claim 45, wherein the wireless identity module contains a private key of the user of the first system and wherein a corresponding public key of the user of the first system is certified by a certification authority.

47. A system as defined in claim 27, wherein the certificate for the key includes the full certification tree for the key, said full certification tree including a certificate of the first system for the user of the first system.

48. A system as defined in claim 27, wherein one usage limitation is that a third party of the second system should accept the key for use in the second system only for certain types of operations.

49. A system as defined in claim 48, wherein an accepted operation is the use of the key for use in the second system for encryption of data but not for signature verification.

50. A system as defined in claim 27, where the certificate does not contain the identity of the user associated with the user generated key, and where the means for signing of the certificate using the authenticated identity of the user of the first system including appending the full certification tree of the first user to the user generated key.

51. A system as defined in claim 27, where the first and second users are the same entity.

52. A wireless device comprising:
means for storing information regarding an authenticated identity of a user in a first system associated with the wireless device;
means for receipt of a certificate from a second device that is part of a second system, the certificate being for a key that is for use in the second system; and
means for establishing the identity of the user in the second system by signing the certificate using the authenticated identity of the user in the first system and transferring the signed certificate to the device of the second system wherein the certificate for the key for use in the second system contains usage limitations, including a temporal limit on usage,
wherein the temporal limit requires that once a secure socket layer session on the second system is completed, the certificate or a corresponding key is destroyed,
wherein said usage limitations also include a limit on use of said key for encryption only, which excludes use of said key for signature verification;
wherein the second device includes means for generating the key to be used in said second system; and
wherein the first system is a wireless communication system and wherein the second system is a computer connected to an Internet.

53. A wireless device as defined in claim 52, wherein the wireless device further comprises means for generating the key to be used in the second system.

54. A wireless device as defined in claim 52, where the authenticated identity of the user in the first system comprises a private-public key pair and a certificate issued by a certification authority, and where the means for signing the second system generated certificate is by encrypting this second system generated certificate using the private key of the first system private-public key pair, wherein the wireless device includes a wireless identity module for storing said private key of the first system private-public key pair.

55. A wireless device as defined in claim 54, wherein the wireless device includes means for user entry of information, wherein the private key of the first system is accessed by entry of a password via said user entry means.

56. A program stored on a computer readable medium for execution by a processor, the program having code for:
generating a key for use in a network environment by a user having an authenticated identity not associated with said network environment;
generating a certificate for the key; and
establishing the identity of the user in said network environment by signing the certificate for the key using the user's authenticated identity,
wherein the certificate for the key for use in the network environment contains usage limitations, including a temporal limit on usage,
wherein the temporal limit requires that once a secure socket layer session on the second system is completed, the certificate or a corresponding key is destroyed,
wherein said usage limitations also include a limit on use of said key for encryption only, which excludes use of said key for signature verification; and
wherein the first system is a wireless communication system and wherein the second system is a computer connected to an Internet.

57. A wireless device comprising:
storage module configured to store information regarding an authenticated identity of a user in a first system associated with the wireless device;
receiving module, configured to receive a certificate from a second device that is part of a second system, the certificate being for a key that is for use in the second system; and
signing module configured to establish the identity of the user in the second system by signing the certificate using the authenticated identity of the user in the first system and transferring the signed certificate to the device of the second system,
wherein the certificate for the key for use in the second system contains usage limitations, including a temporal limit on usage,
wherein the temporal limit requires that once a secure socket layer session on the second system is completed, the certificate or a corresponding key is destroyed,
wherein said usage limitations also include a limit on use of said key for encryption only, which excludes use of said key for signature verification; and
wherein the second device includes a generating module configured to generate the key to be used in said second system, and
wherein the first system is a wireless communication system and wherein the second system is a computer connected to an Internet.

* * * * *